(12) United States Patent
Sommer

(10) Patent No.: US 9,681,267 B2
(45) Date of Patent: Jun. 13, 2017

(54) POSITIONING TECHNIQUES FOR NARROWBAND WIRELESS SIGNALS UNDER DENSE MULTIPATH CONDITIONS

(71) Applicant: Apple Inc., Cupertino, CA (US)

(72) Inventor: Naftali Sommer, Herzeliya Pituah (IL)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 14/749,552

(22) Filed: Jun. 24, 2015

(65) Prior Publication Data

US 2016/0381504 A1 Dec. 29, 2016

(51) Int. Cl.
| | |
|---|---|
| H04W 24/00 | (2009.01) |
| H04W 4/02 | (2009.01) |
| H04W 4/00 | (2009.01) |
| H04L 27/26 | (2006.01) |
| G01S 5/06 | (2006.01) |
| G01S 11/00 | (2006.01) |

(52) U.S. Cl.
CPC ........... H04W 4/023 (2013.01); H04W 4/008 (2013.01); G01S 5/06 (2013.01); G01S 11/00 (2013.01); H04L 27/2695 (2013.01)

(58) Field of Classification Search
CPC ......... H04W 4/023; H04W 4/008; G01S 5/06; G01S 11/00; H04L 27/2695
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,836,580 B2 | 9/2014 | Mendelson | |
| 8,866,673 B2 | 10/2014 | Mendelson | |
| 8,896,485 B2 | 11/2014 | Mendelson | |

(Continued)

OTHER PUBLICATIONS

Banin et al., "Next Generation Indoor Positioning System Based on WiFi Time of Flight," 26th Int'l Tech Mtg Satellite Div Institute Navigation, 8 pages (Sep. 16-20, 2013).

(Continued)

Primary Examiner — Barry Taylor

(74) Attorney, Agent, or Firm — Fish & Richardson P.C.

(57) ABSTRACT

Techniques and systems for position determination using narrowband signals are disclosed. A disclosed technique includes receiving, at a wireless device, signals that are transmitted at different times, each of the signals having a different carrier frequency and representing a different subchannel of a wireless channel; determining estimated magnitudes of the subchannels based respectively on the signals; determining estimated group delays of the subchannels based respectively on the signals; determining an estimated channel frequency response of the wireless channel based on the estimated magnitudes and the estimated group delays; determining a propagation delay of the signals based on the estimated channel frequency response; and generating position information based on the propagation delay.

23 Claims, 10 Drawing Sheets

(56) References Cited

U.S. PATENT DOCUMENTS

| | | |
|---|---|---|
| 8,941,485 B1 | 1/2015 | Mendelson |
| 8,983,493 B2 | 3/2015 | Brachet et al. |
| 9,020,687 B2 | 4/2015 | Mendelson |
| 9,204,251 B1 | 12/2015 | Mendelson |
| 9,204,257 B1 | 12/2015 | Mendelson |
| 9,317,867 B2 | 4/2016 | Johnson |
| 2002/0065047 A1* | 5/2002 | Moose ............... H04L 5/0048 455/67.11 |
| 2002/0118723 A1 | 8/2002 | McCrady et al. |
| 2004/0101072 A1* | 5/2004 | Fitton ............... H04L 1/0061 375/341 |
| 2007/0064773 A1* | 3/2007 | Farhang-Boroujeny ............... H04J 13/00 375/147 |
| 2010/0109903 A1* | 5/2010 | Carrick ............... G01S 5/14 340/8.1 |
| 2011/0156878 A1* | 6/2011 | Wu ............... G01S 5/0081 340/10.1 |
| 2011/0286505 A1 | 11/2011 | Hedley et al. |
| 2012/0064855 A1 | 3/2012 | Mendelson |
| 2012/0106380 A1 | 5/2012 | Vaidyanathan et al. |
| 2013/0128786 A1 | 5/2013 | Sultan et al. |
| 2015/0094086 A1 | 4/2015 | Hedley |
| 2015/0235486 A1 | 8/2015 | Ellis et al. |
| 2015/0331084 A1* | 11/2015 | Kim ............... G01S 5/0257 367/119 |
| 2016/0054440 A1* | 2/2016 | Younis ............... G01S 13/753 342/5 |

OTHER PUBLICATIONS

Li and Pahlavan, "Super-Resolution TOA Estimation With Diversity for Indoor Geolocation," IEEE Transaction on Wireless Comm., 3(1):224-234 (Jan. 2004).

Merritt, "Phase-Strip Sequence Estimation: A Phase Unwrapping/Tracking Algorithm," ICASSP, 86:593-596 (1986).

Roy and Kailath, "ESPRIT—Estimation of Signal Parameters via Rotational Invariance Techniques," IEEE Transactions on Acoustics, Speech, Signal Processing, 37(7):984-995 (Jul. 1989).

Tribolet, "A New Phase Unwrapping Algorithm," IEEE Transactions on Acoustics, Speech, Signal Processing, ASSP-25(2):170-177 (Apr. 1977).

* cited by examiner

POSITIONING TECHNIQUES FOR NARROWBAND WIRELESS SIGNALS UNDER DENSE MULTIPATH CONDITIONS

TECHNICAL FIELD

This disclosure relates generally to radio frequency (RF) positioning technology.

BACKGROUND

Positioning systems used by modern mobile devices use time-of-arrival (TOA) to estimate the distance between a wireless transmitter and wireless receiver. TOA-based techniques estimate the propagation delay of radio frequency (RF) signals arriving on a direct line-of-sight (LOS) path between the wireless transmitter and wireless receiver. For outdoor environments where there are few buildings, the TOA can be accurately estimated. For indoor and dense urban areas that suffer from severe multipath conditions, the TOA is difficult to determine accurately. In these multipath environments, multiple echoes of the transmitted RF signal are received by the wireless receiver. If the RF signal is wideband (i.e., has short transition times), the echoes are separable and the delay to the first echo can be measured by the wireless receiver. However, for narrowband signals, for which the rise time can be much longer than the TOA difference between the echoes, it is difficult for the wireless receiver to distinguish the echoes from each other.

The effect of multipath can be estimated from a frequency spectrum of the received RF signal. Assuming a known transmitted RF signal, the frequency spectrum of the received RF signal will equal the product of the known frequency spectrum of the transmitted RF signal and the frequency response (magnitude and phase) of the multipath channel. For wideband signals, inverse frequency transform techniques can be used to estimate the delays and magnitudes of the echoes, from which the propagation delay can be estimated as the delay from the first echo. For narrowband signals, complex methods can be used to estimate the propagation delay.

SUMMARY

Systems, methods, devices and non-transitory, computer-readable storage mediums are disclosed for positioning techniques for narrowband wireless signals under dense multipath conditions. A positioning technique, for example, can include receiving, at a wireless device, signals that are transmitted at different times, each of the signals having a different carrier frequency and representing a different subchannel of a wireless channel; determining estimated magnitudes of the subchannels based respectively on the signals; determining estimated group delays of the subchannels based respectively on the signals; determining an estimated channel frequency response of the wireless channel based on the estimated magnitudes and the estimated group delays; determining a propagation delay of the signals based on the estimated channel frequency response; and generating position information based on the propagation delay. Other implementations are directed to systems, devices and computer-readable, storage mediums.

These and other implementations can include one or more of the following features. Determining the estimated group delays can include computing phase angles of a subchannel of the subchannels based on a Fourier transformation of a signal of the signals and a Fourier transformation of a reference signal; and applying a fit function to the phase angles to produce an estimated group delay of the subchannel. Applying the fit to the phase angles can include fitting a n-degree polynomial to the phase angles, where n is a positive integer greater than one. Implementations can include generating a pseudo spectrum based on the estimated channel frequency response; and detecting a peak of the pseudo spectrum. Detecting the peak can include selectively ignoring one or more peaks of the pseudo spectrum that do not exceed a threshold. Determining the propagation delay can include using the detected peak. Implementations can include determining estimated phase responses based on the estimated group delays. The estimated channel frequency response can be based on the estimated phase responses. Determining the estimated phase responses can include integrating the estimated group delays to produce the estimated phase responses. Receiving the signals can include receiving a signal that can include multiple versions of a packet that are caused by echoes within the wireless channel. A packet can be transmitted in accordance with a frequency hopping protocol. In some implementations, a frequency bandwidth of each of the subchannels is about 1 MHz. In some implementations, the wireless device is a Bluetooth enabled device.

Another positioning technique, for example, can include receiving, at a wireless device, narrowband signals transmitted over a wireless channel, each narrowband signal having a frequency that is different from frequencies of the other narrowband signals, each narrowband signal representing a subchannel of the wireless channel; estimating, by the wireless device, a subchannel frequency response for each narrowband signal; estimating, by the wireless device, a wireless channel frequency response based on the subchannel frequency responses; and estimating, by the wireless device, a propagation delay of the narrowband signals based on the wireless channel frequency response. Other implementations are directed to systems, devices and computer-readable, storage mediums.

These and other implementations can include one or more of the following features. Estimating the subchannel frequency response can include approximating a magnitude component of the subchannel frequency response as a constant; and approximating a phase component of the subchannel frequency response as a straight line. Approximating the phase component can include computing a group delay by determining a phase difference between the received narrowband signal and the transmitted narrowband signal; and integrating the group delay to obtain the approximated phase component. Approximating the magnitude component can include dividing an energy of the received narrowband signal with an energy of the transmitted narrowband signal. Implementations can include generating, by the wireless device, a pseudo spectrum based on the estimated wireless channel frequency response. Estimating the propagation delay can include identifying a peak in the pseudo spectrum. Estimating the subchannel frequency response can include approximating a magnitude component of the subchannel frequency response as a constant; and approximating a phase component of the subchannel frequency response using an n-order polynomial, where n is a positive integer greater than one. Estimating the subchannel frequency response can include jointly unwrapping phase information and estimating phase fit parameters.

Particular implementations disclosed herein provide one or more of the following advantages. The disclosed implementations allow wireless receivers to estimate TOA accurately from narrowband wireless signals under dense multipath conditions. The TOA estimates can be used to estimate the position of a wireless device in a multipath environment, such as indoor or urban environments. One or more of the disclosed implementations can process packets that have asynchronous phases, e.g., where the oscillator of the transmitter starts transmitting each packet with random phase, uncorrelated from packet to packet.

The details of the disclosed implementations are set forth in the accompanying drawings and the description below. Other features, objects and advantages are apparent from the description, drawings, and claims.

DESCRIPTION OF DRAWINGS

The same reference symbol used in various drawings indicates like elements.

DETAILED DESCRIPTION

System Overview

Figure 1:
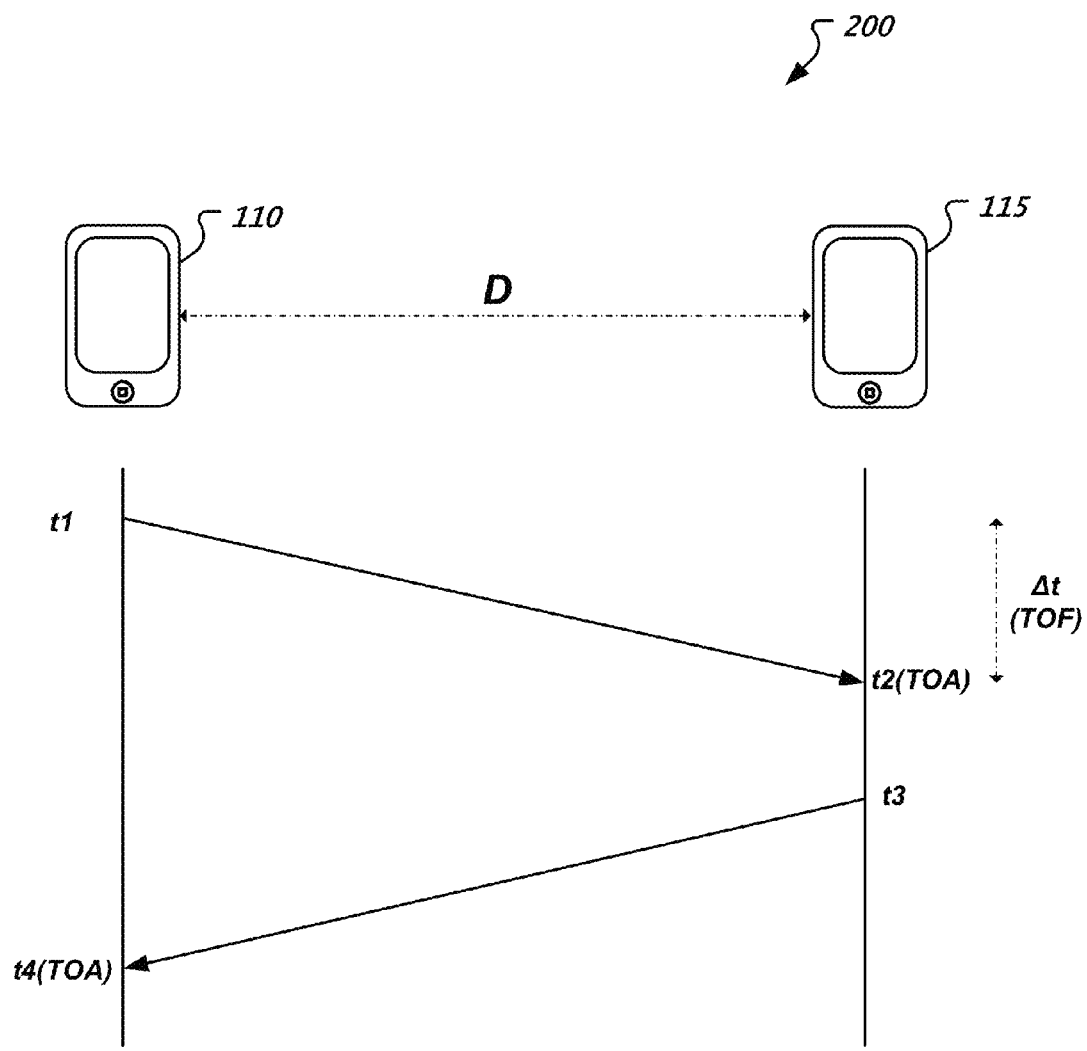
FIG. 1 illustrates an exemplary distance determination technique based on one or more packet exchanges between wireless devices.

FIG. 1 illustrates an exemplary distance determination technique based on one or more packet exchanges between wireless devices 110, 115. In some implementations, the LOS path distance D between devices 110, 115 is determined from the product of the time-of-flight (TOF) and the speed of light c. TOF can be determined using equation [1] below. For example, device 110 transmits a signal at time t1, which is received at device 115 at time t2, which is the time-of-arrival (TOA) of the signal at device 115. Then, device 115 transmits back a signal at time t3 to device 110, which is received at time t4, which is the TOA of the signal at device 110. The TOF and LOS path distance D is given by $$TOF = ((t4-t1)-(t3-t2))/2, \quad [1]$$

$$D = c \cdot TOF. \quad [2]$$

Using equations [1] and [2], a common time base is not required since (t4−t1) and (t3−t2) can be measured independently at each device using its own local time base. While not shown, device 115 can transmit the value of (t3−t2) to device 110 so that it can compute TOF Δt using equation [1].

In a multipath environment, the TOAs (t2 and t4), estimated by devices 115, 110, respectively, are often inaccurate due to dense multipath conditions in the wireless channel. In dense multipath environments, a TOA of an RF signal can be estimated from a plurality of narrowband signals transmitted successively in time, where the narrowband signals modulate different carrier signals having different carrier frequencies. For example, device 115 can transmit narrowband signals by rapidly switching a carrier for the narrowband signals among many frequency subchannels using a pseudorandom sequence known to both devices 110, 115. Subchannel responses are estimated by the devices 110, 115 from the narrowband signals and then used to construct piecewise the wireless channel response by each of the devices 110, 115. The wireless channel response, e.g., magnitude and phase, is used to estimate the TOAs (t2 and t4) in equation [1] from which the LOS path distance D between devices 110, 115 can be calculated using equation [2].

If the LOS path distance from device 110 to three reference wireless devices (e.g., wireless access points) is known, and the positions of the reference wireless devices are known, the position of device 110 can be estimated mathematically using, for example, trilateration. Accordingly, estimating TOA accurately results in a more accurate position fix.

A narrowband positioning technique, in some implementations, can combine different transmissions, each with a different carrier frequency, of narrowband signals, such as the narrowband signals associated with Bluetooth packets, in order to estimate the multipath frequency response over a wide frequency band. The technique, for example, can use Bluetooth which hops over 80 narrowband subchannels, each 1 MHz wide. In some implementations, all the Bluetooth subchannels are used, and the multipath frequency response can be estimated over a bandwidth of 80 MHz. In some implementations, one or more groups of contiguous subchannels are used. For example, an interfering signal may occupy a portion of a frequency range and cause one or more subchannels to be skipped; Bluetooth and the positioning technique can use contiguous subchannels before and after the interfering signal. In some implementations, a portion of the Bluetooth subchannels are used, and an interpolation technique is used to cover any missing subchannels. The technique can include estimating a subchannel response at a hop frequency for a Bluetooth packet, repeating the subchannel response estimation for a number of other hop frequencies, combining the estimations from all hops to construct the channel response over 80 MHz, applying super-resolution algorithm to the constructed channel response, and determining position information based on an output of the super-resolution algorithm. In some implementations, in order to estimate the subchannel frequency response for each narrowband packet, the magnitude of the subchannel response is approximated as a constant (over its narrowband spectrum) and the phase response is approximated as a straight line.

In contrast to wideband signals that have short transition times and whose echoes are separable, some narrowband signals can have rise times that are much longer than the time-of-arrival difference between the echoes which may cause difficulties in distinguishing echoes from each other. In fact, a group of echoes can be misinterpreted as a single echo with an intermediate delay. As an example, a Bluetooth signal has a frequency bandwidth of 1 MHz, which gives a rise time of approximately one microsecond. Location with one meter accuracy implies a time-of-arrival resolution of approximately three nanoseconds. Multipath echoes inside a building can be several nanoseconds apart. Thus, a single Bluetooth packet with a 1 MHz bandwidth is too narrow for three nanosecond accuracy. Therefore, it may be difficult to estimate the time of arrival under these conditions using a single Bluetooth packet. However, combining different Bluetooth packets transmitted over different subchannels can overcome the limitations from a 1 MHz frequency bandwidth.

Figure 2:
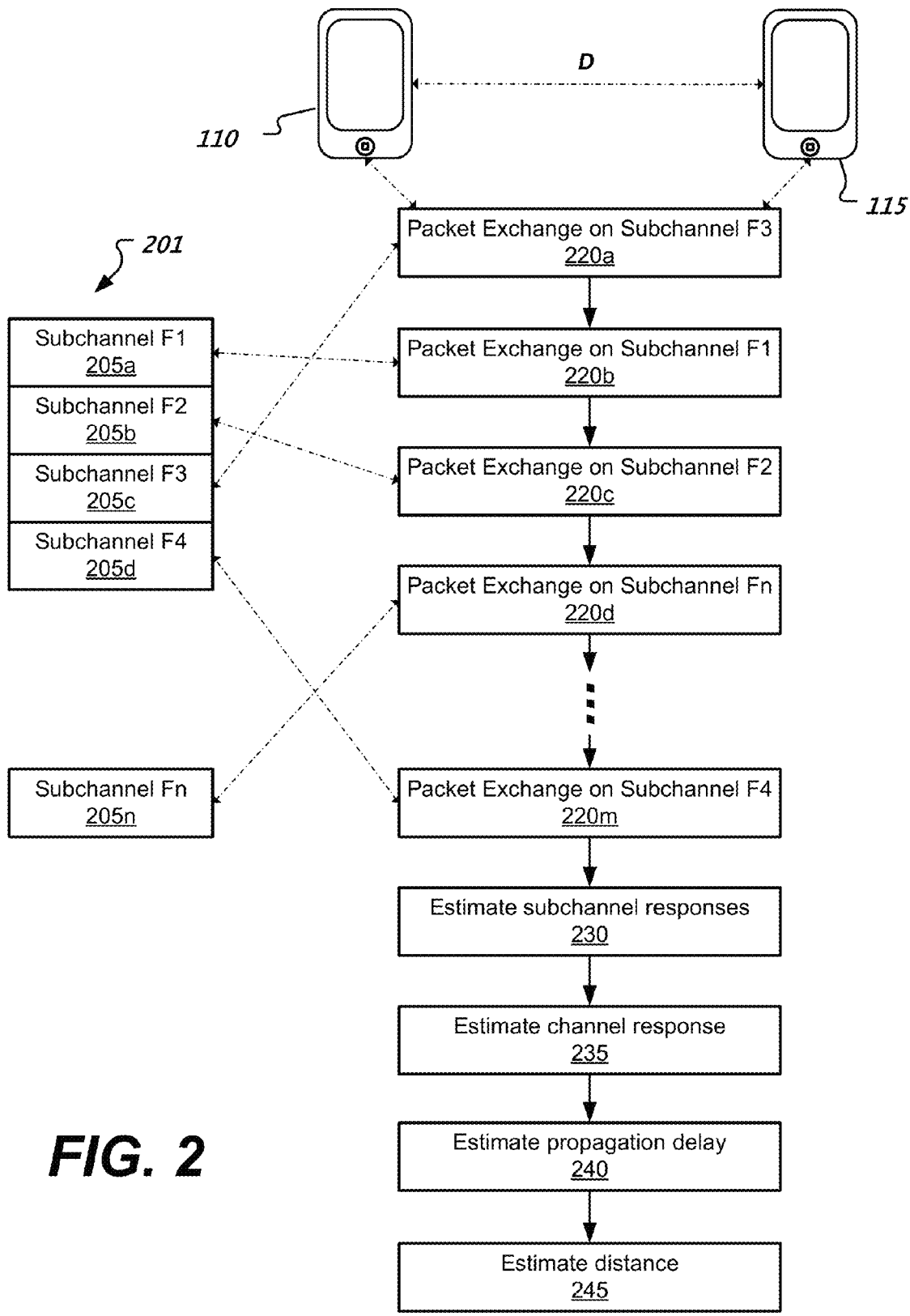
FIG. 2 illustrates exemplary stages of a narrowband signal positioning technique.

FIG. 2 illustrates exemplary stages of a narrowband positioning technique. Wireless devices 110, 115 can communicate via a wireless channel 201 to determine the distance D there between. Various examples of wireless devices 110, 115 include smartphones, tablet computers, notebook computers, wearable computers, beacons, access points, or base stations. In some implementations, wireless device 110 can be a smartphone, whereas wireless device 115 can be an access point or a beacon.

The wireless channel 201 can be divided into narrowband subchannels 205a-205n, that have corresponding carrier frequencies F1 to Fn. Wireless devices 110, 115 can employ an adaptive frequency-hopping (AFH) technique where packets are transmitted successively in time over subchannels 205a-205n selected based on a pseudorandom sequence. Wireless devices 110, 115 can use AFH-based protocol such as Bluetooth. In this example, the subchannels 205a-205n are narrowband. In some implementations, the subchannels 205a-205n can have a narrowband frequency bandwidth of 1 MHz. In some implementations, a narrowband frequency bandwidth is a bandwidth being less than 1/10 of 1/t, where t is the required timing accuracy, or equivalently: the product of the bandwidth and the required timing accuracy is less than ten percent. For example, for a positioning accuracy of 1 meter, the required timing accuracy is 3.3 nanoseconds. A signal, for example, can be classified as narrowband if the product of its bandwidth B and 3.3 nanoseconds is less than ten percent: B<30 MHz.

The devices 110, 115 can perform packet exchanges 220a-220m over different subchannels 205a-205n based on AFH. The frequency responses of the subchannels 205a-205n are estimated (230) and used to construct piecewise a frequency response for the overall wireless channel (235). A propagation delay can be estimated based on the channel response (240). A distance D between devices can be derived from the propagation delay. In some implementations, the frequency response of the overall wireless channel is used to estimate the TOAs at devices 110, 115, the estimated TOAs are used to estimate the TOF and the estimated TOF is used to estimate distance D.

In some implementations, each packet exchange 220a-220m can include one or more packets. In some implementations, each packet exchange 220a-220m includes a packet and an acknowledgement. In some implementations, a packet exchange 220a-220m can include sending information about a processing delay between receiving a packet and sending a corresponding acknowledgement.

In some implementations, estimating a subchannel frequency response can include approximating a magnitude component and a phase component of the subchannel frequency response. In some implementations, the magnitude of the subchannel frequency response is estimated as a constant. In some implementations, the phase component of the subchannel frequency response is estimated using an n-order polynomial, where n is a positive integer greater or equal to one. For example, if n=1 then the subchannel phase is estimated using a straight-line approximation.

In some implementations, the constructed channel response can be provided to a super-resolution algorithm such as MUSIC to estimate the TOA. The MUSIC super-resolution algorithm is described at least in Xinrong Li and Kaveh Pahlavan, "Super-Resolution TOA Estimation With Diversity for Indoor Geolocation," IEEE TRANSACTIONS ON WIRELESS COMMUNICATIONS, VOL. 3, NO. 1, JANUARY 2004, pp. 224-234. In this paper, a multipath propagation channel can be modeled in the time domain as:

$$h(t) = \sum_{k=0}^{L_p-1} \alpha_k \delta(t - \tau_k)$$

where $L_p$ is the number of multipath components, where $\alpha_k$ is based on the complex attenuation and propagation delay of the kth path, and $\tau_k$ represents the propagation delay of the kth path. The multipath frequency response is then:

$$H(f) = \sum_{k=0}^{L_p-1} \alpha_k e^{-j2\pi f \tau_k}$$

The input to the MUSIC algorithm includes L noisy channel spectrum estimations at $f_0, f_0+\Delta f, \ldots, f_0+(L-1)\Delta f$ which is given by:

$$x(l) = H(f_l) + w(l) = \sum_{k=0}^{L_p-1} \alpha_k e^{-j2\pi(f_0+l\Delta f)\tau_k} + w(l)$$

for l=0, 1, . . . , L−1, where w(l) is the noise. The MUSIC algorithm generates a pseudo spectrum that can be used to determine a TOA.

Figure 3:
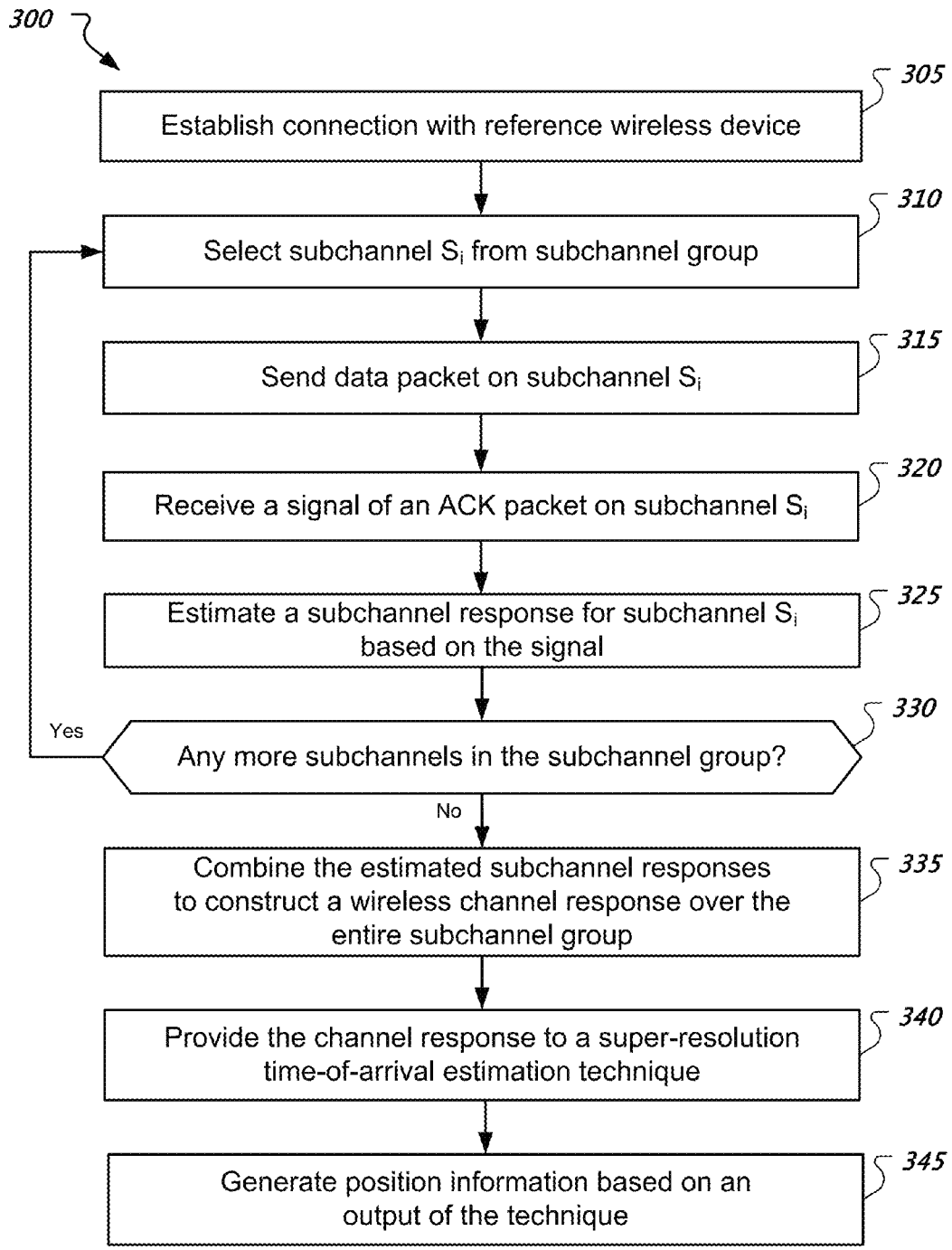
FIG. 3 illustrates an exemplary positioning process performed by a wireless device.

FIG. 3 illustrates an exemplary positioning process 300 performed by a wireless device. The process 300 can establish a connection with a reference wireless device (305). In some implementations, a data exchange can be initiated using Bluetooth to transfer a file, and the positioning process 300 can passively analyze the received signals associated with the file transfer. The process 300 can select a subchannel $S_i$ from subchannel group (310). In some implementations, selecting a subchannel can include using a pseudorandom sequence to obtain a subchannel. The process 300 can send a data packet on subchannel $S_i$ to the reference wireless device (315). The process 300 can receive a signal of an acknowledgement (ACK) packet on subchannel $S_i$ from the reference wireless device (320). The process 300 can estimate a subchannel response for subchannel $S_i$ based on the signal (325). The process 300 can determine whether there are any more subchannels in the subchannel group (330). If there are one or more subchannels left in the group, the process can loop back to 310. If there are no more subchannels left in the group, the process 300 can continue. In some implementations, if all of the subchannels in the group have been used at least once the process can continue. In some implementations, if a predetermined number of the subchannels in the group have been used at least once the process can continue.

Figure 4:
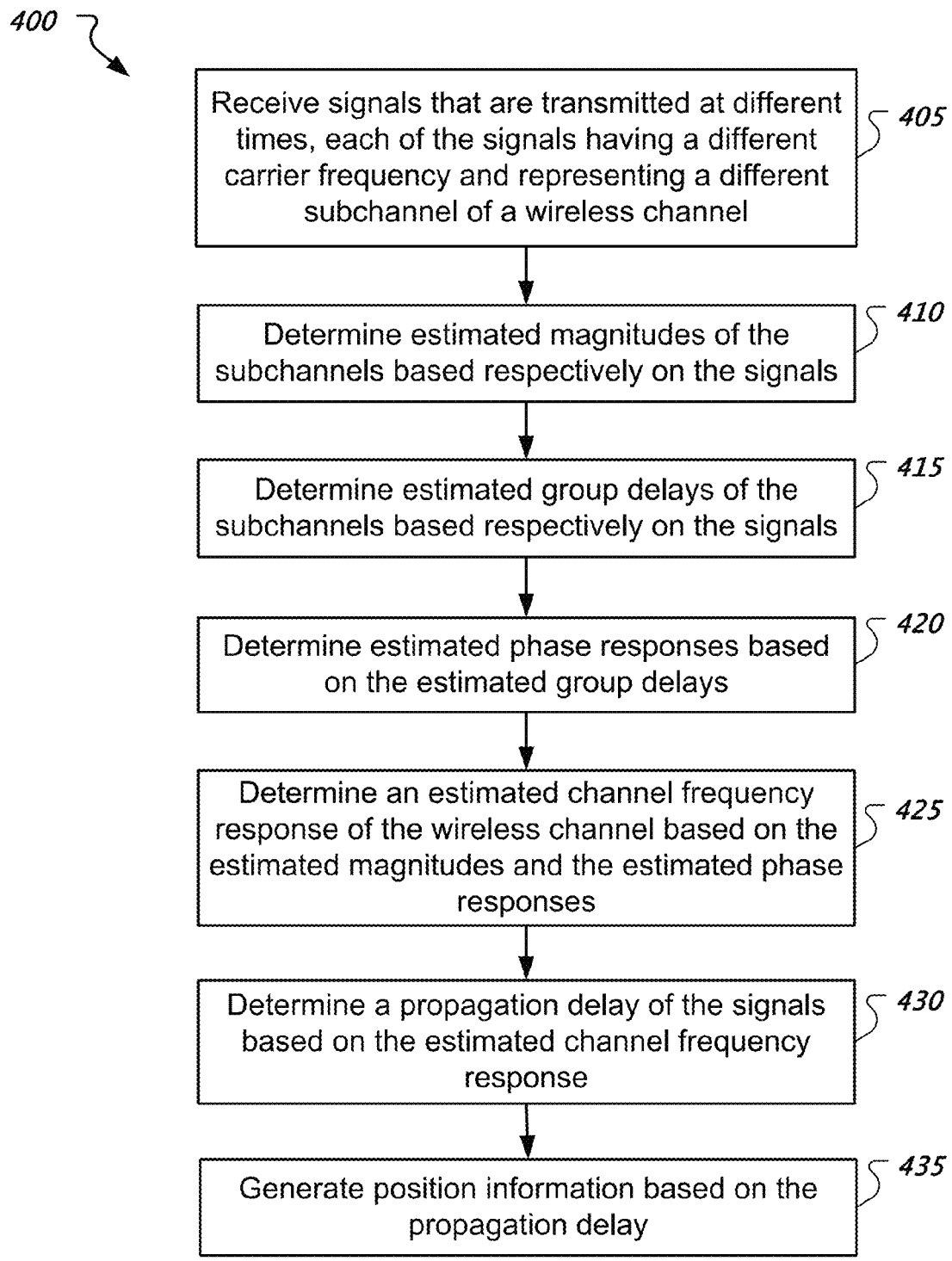
FIG. 4 illustrates another exemplary positioning process performed by a wireless device.

Given the set of subchannel responses, the process 300 can combine the estimated subchannel responses to construct piecewise the overall wireless channel response (335), as described in reference to FIG. 4. The process 300 can provide the overall wireless channel response to a super-resolution time-of-arrival estimation technique (340). The process 300 can generate position information based on an output of the technique (345). In some implementations, position information can include a relative distance between devices. In some implementations, position information can include two or more coordinates such as latitude or longitude. In some implementations, the process 300 can provide the overall wireless channel response to a TOA estimator to estimate the TOAs, and generate a TOF from the estimated TOAs using equation [1], which can then can be used to estimate the distance D using equation [2]. In some implementations, the process 300 can be applied to a case where two devices establish a connection and one or more other devices listen to the transmission and estimate the delay. For example, three access points (APs) can be placed in known positions, and a target device can communicate with one of the APs while the other APs can listen and estimate, and then the measurements of all three APs can be combined to find the position of the target device.

FIG. 4 illustrates another exemplary positioning process 400 performed by a wireless device. The process 400 can receive signals that are transmitted at different times, each of the signals having a different carrier frequency and representing a different subchannel of a wireless channel (405). Receiving a signal can include receiving multiple versions of a packet that are caused by echoes. In some implementations, the packet is transmitted in accordance with a frequency hopping protocol such as Bluetooth. In some implementations, a standard length Bluetooth packet is used. In some implementations, a shorter length, not yet standardized, Bluetooth packet can be used to decrease transmission time. In some implementations, the packet is transmitted in accordance with an IEEE 802.11 standard.

The process 400 can determine estimated magnitudes of the subchannels based respectively on the signals (410). In some implementations, a magnitude can be estimated based on the energy out divided by energy in. For example, the energy associated with a received signal can be divided by a reference energy value to determine a magnitude that reflects the degree of signal attenuation within the subchannel.

The process 400 can determine estimated group delays of the subchannels based respectively on the received signals (415). Determining the estimated group delay for a subchannel can include computing a phase angle between samples of the subchannel input and the subchannel output using one or more Fourier transformations, and applying a fit function to the phase angles to produce an estimated group delay of the subchannel. In some implementations, applying the fit function to the phase angles can include applying a linear least squares fit function. In some implementations, applying the fit function to the phase angles can include fitting an n-degree polynomial to the phase angles, where n is a positive integer greater or equal to one. In some implementations, a group delay can be estimated by performing a Fast Fourier Transformations (FFT) of the subchannel input to produce vector $F_i$ and a FFT on windowed samples of the subchannel output, e.g., samples of the received signal, to produce vector $F_o$, where the elements of the vectors are complex numbers output by the FFT, and then determining a subchannel phase vector of subchannel phase angles from the FFT output vectors, and performing a linear least squares fit of the subchannel phase vector. Note that phase angles should be unwrapped carefully to avoid $2\pi$ jumps due to noise. Determining a subchannel phase vector can include computing angle $(F_o*F'_i)$, where * represents a pairwise multiplication of complex numbers, $F'_i$ is the complex conjugate of $F_i$, and angle is a function to compute the phase angles for each vector element. In some implementations, determining the estimated group delays can include performing a timing-loop-based estimation of the delay for each packet.

The process 400 can determine estimated phase responses based on the estimated group delays (420). Determining the estimated phase responses can include integrating the estimated group delays to produce the estimated phase responses. Integrating the estimated group delays can include sorting the estimated group delays based on their corresponding carrier frequencies and recursively integrating the estimated group delays to produce the estimated phase responses.

The process 400 can determine an estimated channel frequency response of the wireless channel based on the estimated magnitudes and the estimated phase responses (425). In some implementations, the estimated phase responses are not required to be determined in a separate intermediate operation, and the estimated channel frequency response can be determined using the estimated group delays directly rather than the estimated phase responses. For example, the propagation delays can be estimated directly from the group delays and magnitudes, without a need to reconstruct the estimated channel frequency response as an intermediate step.

The process 400 can determine a propagation delay of the signals based on the estimated channel frequency response (430). In some implementations, the process 400 can provide the estimated channel frequency response to a super-resolution technique, such as MUSIC, ESPRIT, or a high resolution inverse FFT technique, and use the output of the super-resolution technique to determine the propagation delay as the delay of the first echo. For example, the process 400 can generate a pseudo spectrum based on the estimated channel frequency response, detect a peak of the first echo in the pseudo spectrum and use the detected peak to determine the propagation delay.

The process 400 can generate position information based on the propagation delay (435). In some implementations, position information can include a distance between the wireless device and a source of the signals. In some implementations, position information can include latitude, longitude, and/or altitude. For example, the process 400 can generate propagation delays for different signal sources and determine a geographical position of the wireless device based on a combination of the propagation delays and geographical positions of the signal sources.

In some implementations, the process 400 can use 20 MHz WiFi signals, by transmitting several packets at several WiFi channels, to estimate delays. For example, four 20 MHz WiFi channels can be concatenated to yield an 80 MHz spectrum. The MUSIC algorithm can be applied on the concatenated 80 MHz spectrum to estimate the delays. The concatenation of the phase responses can be done by appending the phase response of the next 20 MHz to the previous 20 MHz such that the resulting concatenated phase response is continuous, e.g., a constant phase is added to the higher spectrum such that the left most phase point of the higher spectrum equals the rightmost phase point of the lower spectrum.

In some implementations, the process 400 uses bidirectional transmissions at each carrier frequency in order to avoid the need for a global common time base. However, in some other implementations, the process 400 can use back transmissions only for part of the carrier frequencies. A back transmission at one carrier frequency can be used by other frequencies, which can result in reducing the overall, total delay measurement time, since fewer transmissions are used.

Note that estimating a group delay at a given subchannel can be equivalent to estimating a pure time delay imposed by the channel when transmitting a narrowband signal in the given subchannel. If the phase function can be approximated by a straight line and the magnitude by a constant (over the frequency band of the subchannel), then the subchannel acts as a gain plus pure delay (equal to the minus of the slope of the phase, e.g., the group delay). A delay estimation technique can include estimating the delay between a transmitted reference signal and a received signal. Applying a least square linear fit to a phase function is an example of how delays can be estimated. Another example includes finding the peak of a cross-correlation between the reference and received signals. Yet another example includes using a timing loop of the receiver; a digital receiver can include a timing loop that estimates the right points to sample the incoming signal in order to detect the data symbols. After the loop converges, the sampling points that it generates can be used to estimate the delay by comparing these points to the optimal sampling points of the reference signal.

Figure 5:
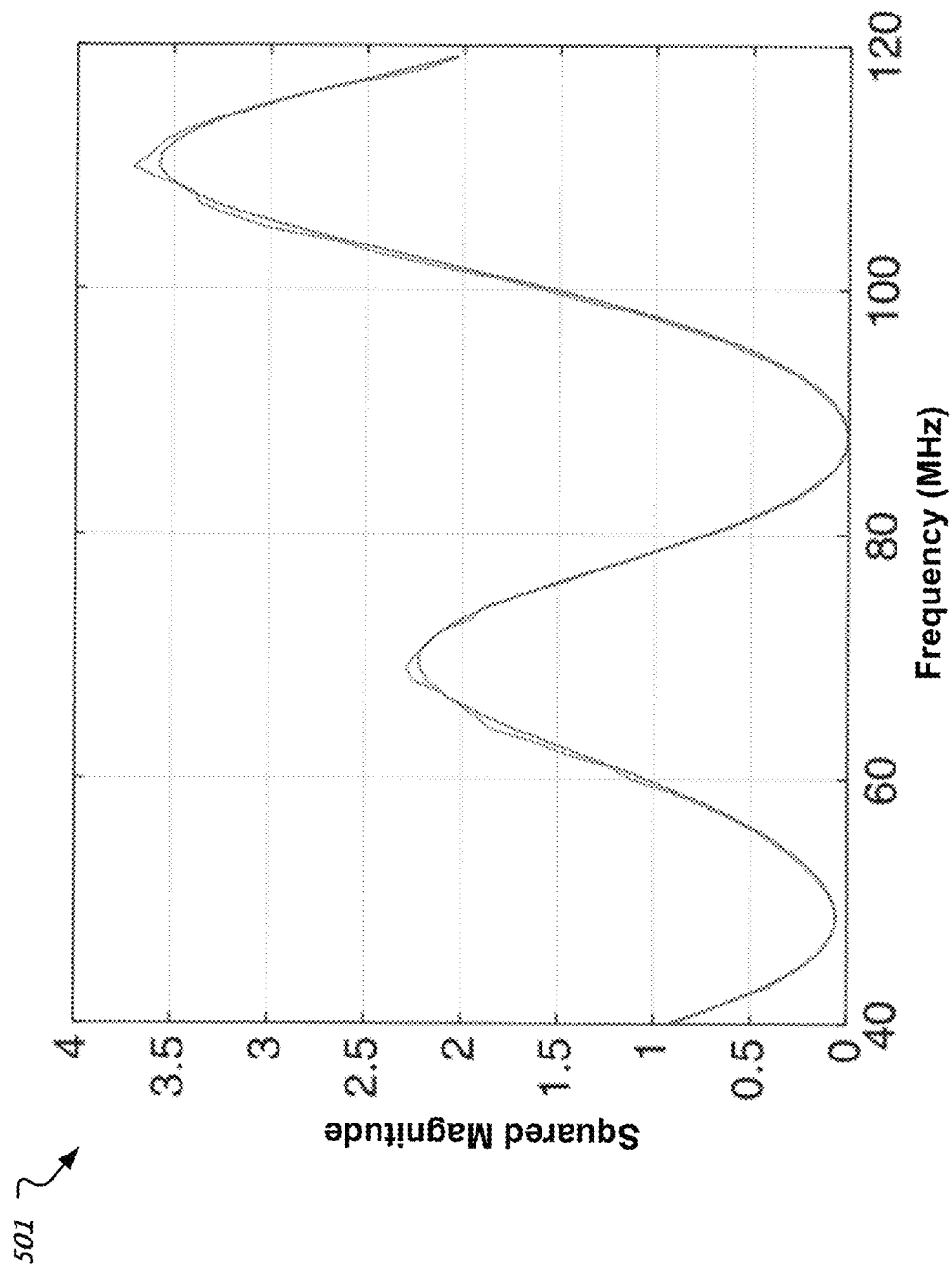
FIG. 5 is a graph of an example of estimated channel magnitude of a wireless channel constructed from subchannel responses.

FIG. 5 is a graph 501 of an example of estimated squared magnitudes for respective subchannels of a wireless channel. The graph 501 depicts a smooth curve representing the actual squared magnitudes and a piecewise curve representing the estimated squared magnitudes for different carrier frequencies. A positioning process can estimate magnitudes for respective subchannels based on the received energy divided by a reference energy input value for each subchannel. The received energy can be based on multiple samples of a received signal corresponding to a subchannel.

Figure 6:
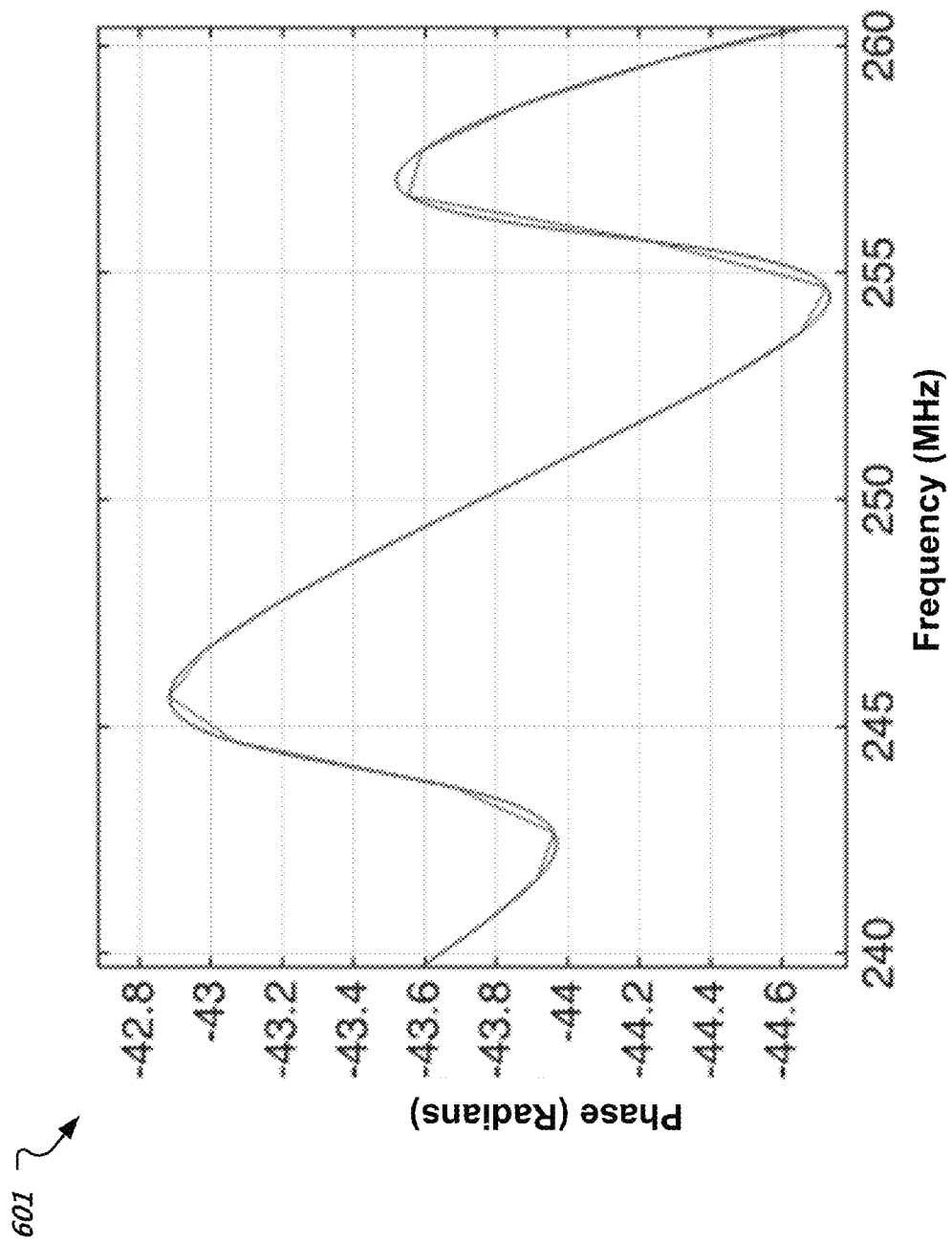
FIG. 6 is a graph of an example of estimated phase of a wireless channel constructed from subchannel responses using a piecewise linear approximation.

FIG. 6 is a graph 601 of an example of estimated phases for respective subchannels of a wireless channel using a piecewise linear approximation for channel phase estimation. In this example, a phase is estimated by a linear approximation for each subchannel. This results in line segments for each subchannel, where the slope of the line segment is based on the estimated phase. The piecewise linear approximation is constructed by connecting the line segments, e.g., the rightmost point of a subchannel's line segment coincides with the leftmost point of the next subchannel's line segment.

The slope of the straight line in each interval, e.g., subchannel frequency range, is the group delay of the multipath equivalent filter at the corresponding carrier frequency, and can be estimated by the delay imposed by the wireless channel at this subchannel. The overall channel phase responses can be generated by integrating the group delays. Note that errors may be accumulated, especially large group delay estimation errors that occur in case of channel spectral nulls. However, assuming M intervals, the MUSIC algorithm only correlates L<M samples apart, so effective error accumulation is only along L subchannels. In some implementations, higher-order interpolation can be used for phase estimation in each interval. This may improve the estimation accuracy when the subchannels are relatively wide, or near spectral nulls where the phase may change faster.

Figure 7:
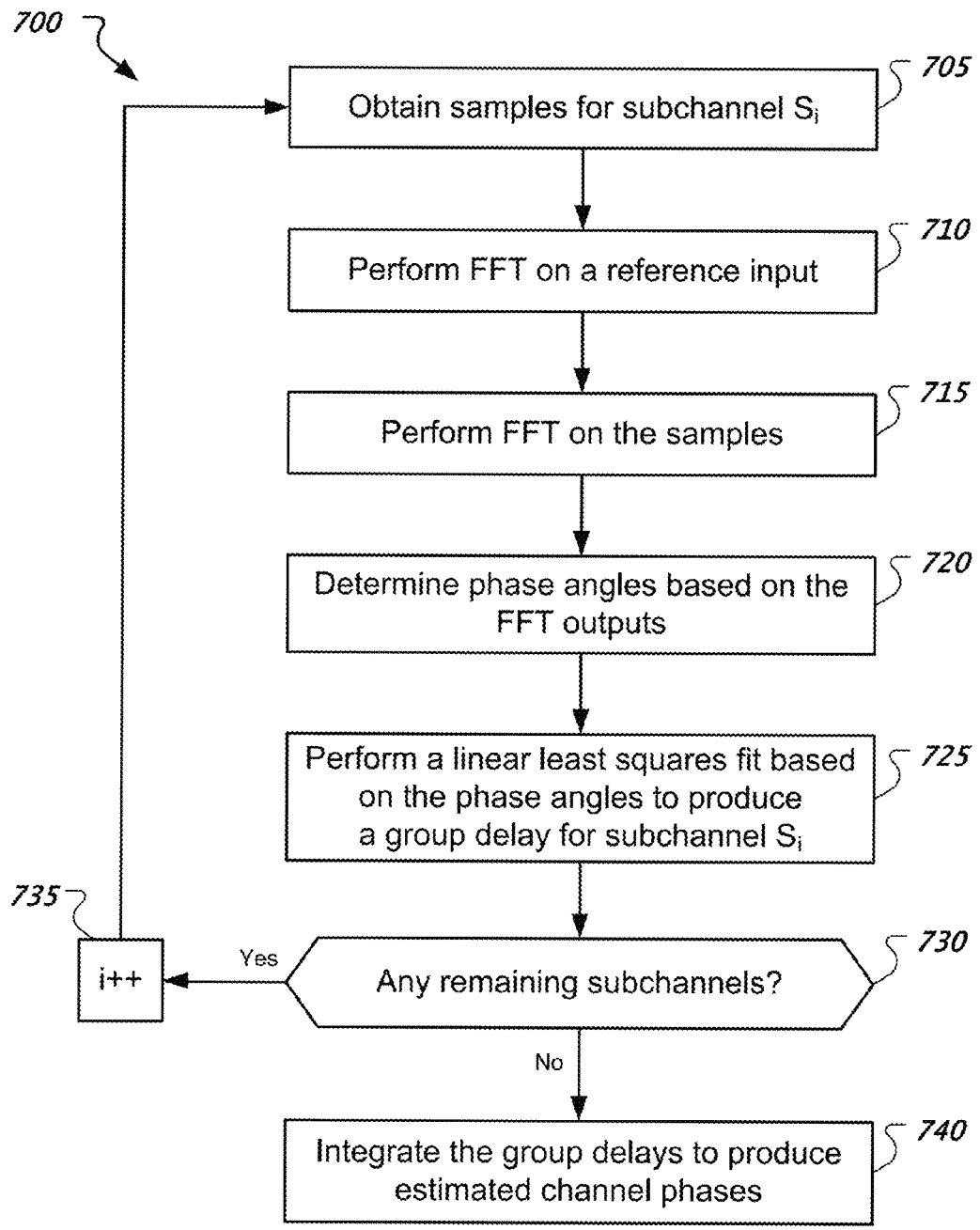
FIG. 7 illustrates an exemplary subchannel group delay estimation and integration process performed by a wireless device.

FIG. 7 illustrates an exemplary subchannel group delay estimation and integration process 700 performed by a wireless device. The process 700 can obtain samples for subchannel $S_i$ (705). Obtaining samples can include accessing data from an analog-to-digital converter (ADC) that is operated on a received signal. Obtaining samples can include accessing a memory that stores ADC output values. The process 700 can perform a FFT on a reference input (710). The reference input can be based on a known signal that corresponds to what was transmitted, whereas the samples correspond to what was received. The process 700 can perform a FFT on the samples (715).

The process 700 can determine phase angles based on the FFT outputs (720). Determining phase angles can include computing angle $(F_o * F'_i)$ as discussed above. The process 700 can perform a linear least squares fit based on the phase angles to produce a group delay for subchannel $S_i$ (725). In some implementations, the process 700 can perform a Recursive Least Squares (RLS) technique to fit a line to the phase angles. The process 700 can determine if there are any remaining subchannels (730). If there is at least one remaining subchannel, the index i is incremented (735) and the process 700 continues at 705. If there are no remaining subchannels, the process 700 can integrate the group delays to produce estimated channel phases (740).

The following provides an example of a Phase Fitting and Unwrap (PFU) algorithm that implements a least squares phase fitting and unwrapping technique. The PFU algorithm can jointly unwrap phase information and estimate phase fit parameters such as least squares parameters. The inputs to the algorithm include angular frequency vector ω with elements ω(1), ω(2), . . . , ω(N) and input phase vector $\theta_{in}$ with elements $\theta_{in}(1)$, $\theta_{in}(2)$, . . . , $\theta_{in}(N)$. The input phase vector elements provide the phase values for respective frequency vector components. In some implementations, the input phase vector is $\theta_{in}$=angle$(F_o * F'_i)$ as discussed above. The outputs include an estimated phase slope a which can be referred to as the group delay, and an unwrapped output phase vector $\theta_{out}$.

The PFU algorithm includes a tol input value for the required tolerance, the value representing the maximum allowed phase deviation from its linear prediction. Further, the PFU algorithm includes a RLS_start_index parameter that specifies the index for which linear least squares fit starts. Note that for the first few samples it may be advantageous to skip them in order to avoid large errors due to a single outlier. In some implementations, RLS_start_index can be set to 10.

PFU Algorithm:

```
a = 0, b = θ_in(1)  // a and b are the coefficients of the linear
fit θ̂ = a · ω + b
θ_out(1) = θ_in(1)
u = 0  // undetermined phase point counter
FOR k = 2 to N
    θ̂(k) = a · ω(k) + b  // predict the phase using the linear fit
    IF (∃z∋ |θ̂(k) − [θ_in(k) + 2πz]| < tol)
        θ_out(k) = θ_in(k) + 2πz
        IF (k ≥ RLS_start_index )  // least squares fit already active
            a, b = LLS (θ_out, ω, k)
        ELSE
            a = 0, b = θ_out(k)  // prediction is the last valid sample
        ENDIF
    ELSE
        Mark θ_out(k) as an undetermined phase point
        u++
    ENDIF
    IF (k == RLS_start_index − 1)  // LS fit should start in the
    next sample
        IF (u ≥ k − 2)  // too many undetermined phase points
            RLS_start_index += 10  // skip more points
            a = 0, b = θ_in(k)
            θ_out(k)= θ_in(k)
            Mark points 1,2,...,k−1 as undetermined phase points
            Mark point k as a determined phase point
            u = k − 1
        END
END
```

PFU Algorithm:

END // of for loop
    For undetermined phase points:
        Perform $\theta_{out}(k) = a \cdot \omega(k) + b$ // set to linear prediction value Note that in the PFU Algorithm, the LLS $(\theta_{out},\omega,k)$ routine performs a linear least squares fit of $\theta_{out}(1)$, $\theta_{out}(2)$, ..., $\theta_{out}(k)$ to $\omega(1)$, $\omega(2)$, ..., $\omega(k)$ and returns fit coefficients a and b. Further, the LLS routine can skip one or more $\theta_{out}$ values that are marked as undetermined phase points. In some implementations, the LLS routines fit points using an RLS algorithm. In some implementations, in determining $\theta_{out}(k)$, any underdetermined phase points can be set to their linear prediction value.

A group delay integration algorithm can operate on M subchannels, where the frequency range of the ith subchannel is $[f_0+(i-1)\Delta f, f_0+i\Delta f]$, and the group delay of the ith subchannel is $g_i$ for $i=1, 2, \ldots, M$. In some implementations, the frequency is in units of Hz and the group delay is in units of seconds. At each subinterval, the phase response is a line with slope $g_i$, whose leftmost point coincides with the rightmost point of the phase response of the previous subchannel. The phase response at subchannel 1 is $$\theta_1(f) = g_1 \cdot 2\pi(f-f_0)$$

and the phase responses for the remaining subchannels (calculated recursively using $\theta_{i-1}$) are computed as follows:

$$\theta_i(f) = g_i \cdot 2\pi(f-f_0-(i-1)\Delta f) + \theta_{i-1}(f_0+(i-1)\Delta f)$$

for $i=2$ to M.

In some implementations, there is one phase point per subchannel, taken at the leftmost point of a subchannel frequency range. The phase responses for subchannel 1 and the remaining subchannels become:

$$\theta_1 = 0$$

$$\theta_i = 2\pi\Delta f \Sigma_{j=1}^{i-1} g_i\ i=2, \ldots, M$$

In some implementations, there is one phase point per subchannel, taken at the middle point of a subchannel frequency range. The phase responses for subchannel 1 and the remaining subchannels become:

$$\theta_1 = \pi\Delta f \cdot g_1$$

$$\theta_i = \pi\Delta f \cdot g_i + 2\pi\Delta f \Sigma_{j=1}^{i-1} g_i\ i=2, \ldots, M$$

Some implementations can sample the above phase responses two or more times in each subchannel. The MUSIC algorithm can then be used with a higher resolution channel frequency response as an input. Further, instead of fitting a linear curve to the phase response in each subchannel, some implementations can fit a higher order polynomial such as a $3^{rd}$ degree polynomial $\hat{\theta} = \alpha_2 \cdot \omega^2 + \alpha_1 \cdot \omega + b$. Fitting can be done in the least squares sense, using, for example, the RLS method. Then, a piecewise polynomial approximation (instead of a piecewise linear approximation) can be constructed for the phase response, where in each subchannel the leftmost point coincides with the rightmost point of the previous subchannel. This may be useful in cases where the phase response has a high slope, such as near spectral nulls. In some implementations, a technique can generate two or more phase points per subchannel in order for a higher-order approximation to be effective.

Figure 8:
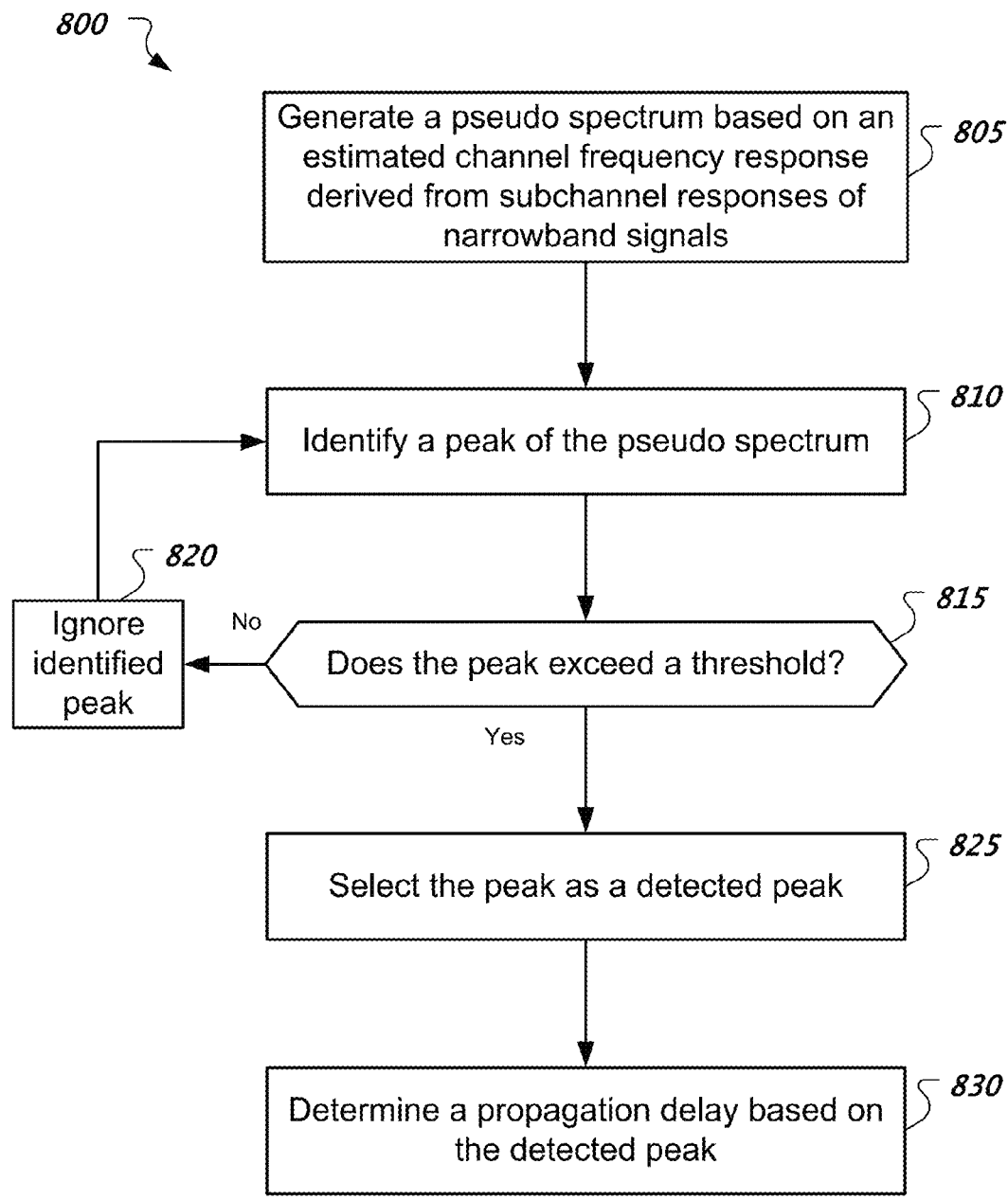
FIG. 8 illustrates an exemplary pseudo spectrum generation and peak detection process performed by a wireless device.

FIG. 8 illustrates an exemplary pseudo spectrum generation and peak selection process 800 performed by a wireless device. The process 800 can generate a pseudo spectrum based on an estimated channel frequency response derived from subchannel responses of narrowband signals (805). Generating a pseudo spectrum can include computing an autocorrelation matrix R based on the estimated channel frequency response, computing the eigenvectors of R, sorting the eigenvectors by descending eigenvalues, and computing the pseudo spectrum based on the sorted eigenvectors as specified by the MUSIC algorithm.

The process 800 can identify a peak of the first echo in the pseudo spectrum (810). The process 800 can determine whether the identified peak exceeds a threshold (815). If the identified peak does not exceed the threshold, the process 800 can ignore the identified peak (820), and continue to identify the next peak in the pseudo spectrum (810). If an identified peak exceeds the threshold, the process 800 can select the threshold-exceeding peak as the detected peak of the first echo (825). The process 800 can determine a propagation delay based on the detected peak (830). In some implementations, the threshold is based on a predetermined percentage of the global peak, for example as 1/20 of the global peak. In some implementations, a peak is a local maximum point, e.g., a point larger than both its neighbors from left and right. The edge points, e.g., leftmost and rightmost edges of the x-axis scanned range, can be regarded as peaks if they happen to be the global maximum over the whole axis.

Figure 9:
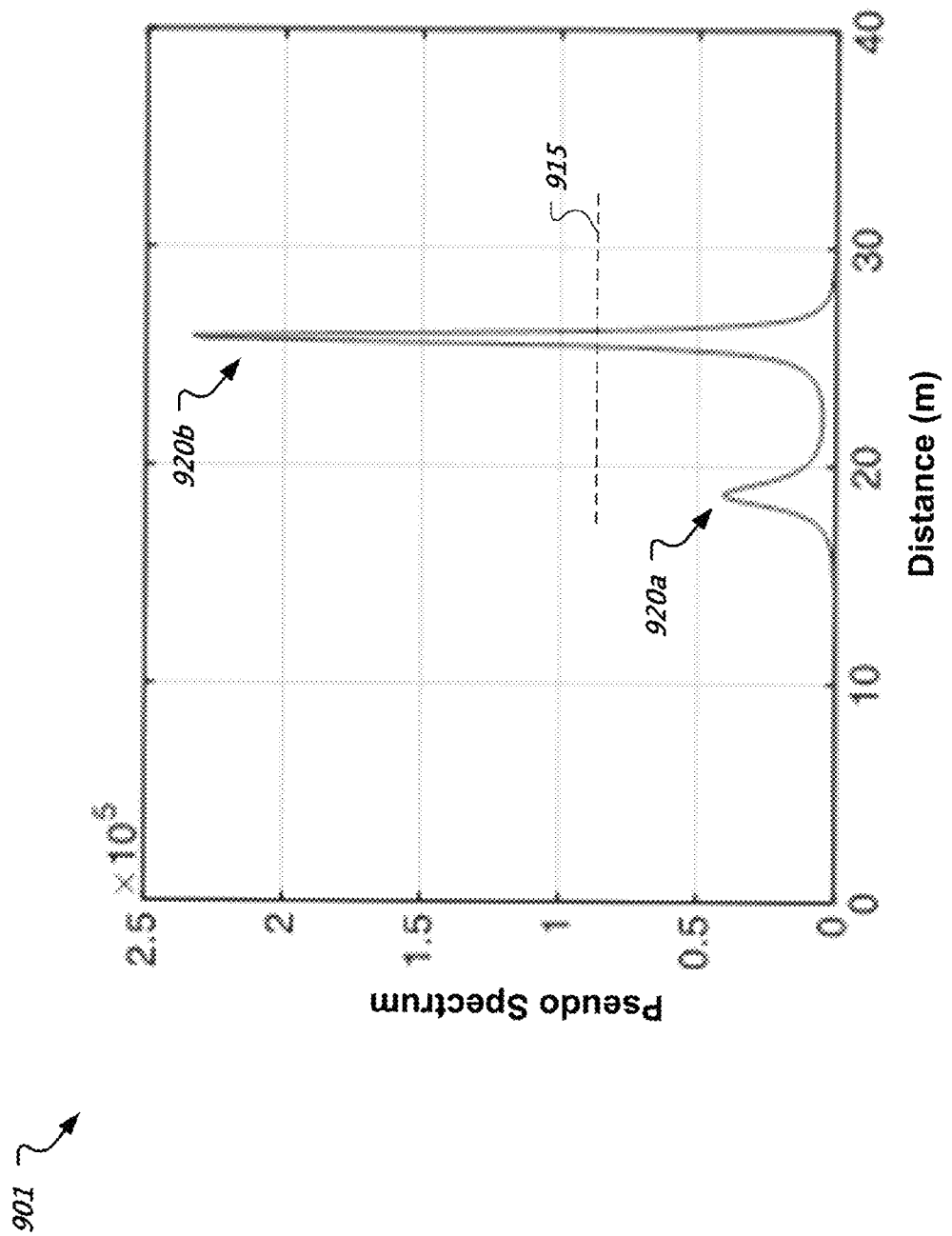
FIG. 9 is a graph of an example of a threshold peak detection based on a pseudo spectrum.

FIG. 9 is a graph 901 of an example of a threshold peak detection based on a pseudo spectrum. The graph 901 depicts pseudo spectrum values and their corresponding distances. Using narrowband signals, such as those associated with Bluetooth, for positioning may cause the pseudo spectrum generated by a super-resolution technique to include multiple peaks 920*a-b*. A threshold 915 can be set to ignore peaks having too low of an amplitude. Detecting a peak 920*b* that exceeds the threshold 915 can improve position accuracy. Based on the detected peak 920*b* corresponding to the first echo, the corresponding distance can be ascertained. In some implementations, based on a detected peak 920*b*, the corresponding propagation delay can be ascertained and a distance derived from the propagation delay. Note that in general there may be several peaks that are below the threshold 915 and several peaks above the threshold 915. Those below can be eliminated. Those above can represent the various multipath reflection delays, from which the earliest is assumed to represent the line of sight path and can be used for delay estimation.

A wireless device, in some implementations, can include a receiver configured to receive signals that are transmitted at different times, each of the signals having a different carrier frequency and representing a different subchannel of a wireless channel. The device can include a processor coupled with the receiver. The processor can be configured to determine estimated magnitudes of the subchannels based respectively on the signals, determine estimated group delays of the subchannels based respectively on the signals, determine an estimated channel frequency response of the wireless channel based on the estimated magnitudes and the estimated group delays, determine a propagation delay of the signals based on the estimated channel frequency response, and generate position information based on the propagation delay.

Figure 10:
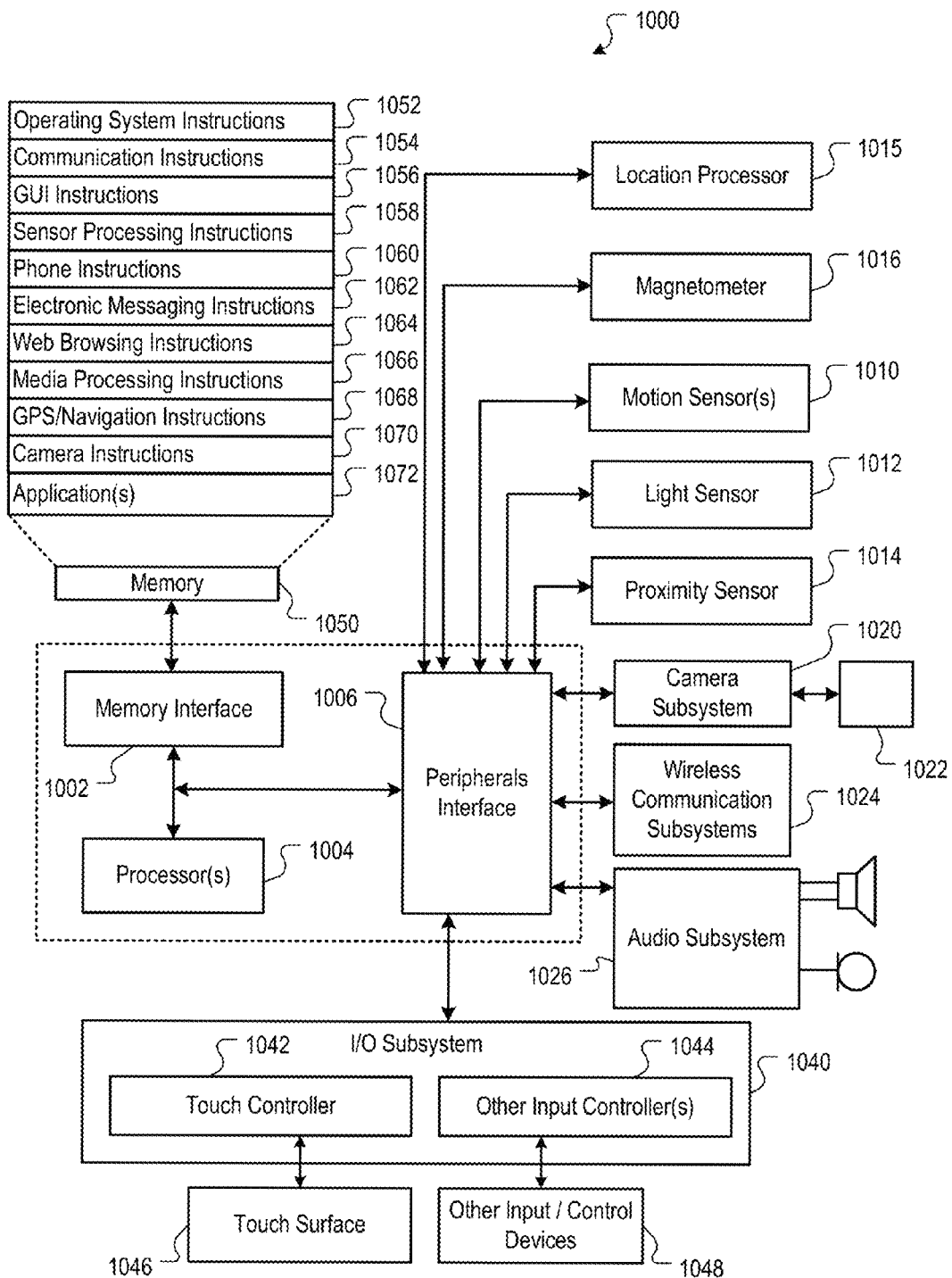
FIG. 10 is a block diagram of an example wireless device architecture.

FIG. 10 is a block diagram of example wireless device architecture. The architecture may be implemented in any device 1000 for generating the features described in this specification, including but not limited to portable computers, smart phones and electronic tablets, game consoles, wearable devices and the like. Device 1000 may include memory interface 1002, data processor(s), image processor(s) or central processor(s) 1004, and peripherals interface 1006. Memory interface 1002, processor(s) 1004 or peripherals interface 1006 may be separate components or may be integrated in one or more integrated circuits. One or more communication buses or signal lines may couple the various components.

Sensors, devices, and subsystems may be coupled to peripherals interface 1006 to facilitate multiple functionalities. For example, motion sensor 1010, light sensor 1012, and proximity sensor 1014 may be coupled to peripherals interface 1006 to facilitate orientation, lighting, and proximity functions of the device. For example, in some implementations, light sensor 1012 may be utilized to facilitate adjusting the brightness of touch surface 1046. In some implementations, motion sensor 1010 (e.g., an accelerometer, gyros) may be utilized to detect movement and orientation of the device. Accordingly, display objects or media may be presented according to a detected orientation (e.g., portrait or landscape). Other sensors may also be connected to peripherals interface 1006, such as a temperature sensor, a biometric sensor, or other sensing device, to facilitate related functionalities. Location processor 1015 (e.g., GPS receiver chip) may be connected to peripherals interface 1006 to provide geo-positioning. Electronic magnetometer 1016 (e.g., an integrated circuit chip) may also be connected to peripherals interface 1006 to provide data that may be used to determine the direction of magnetic North. Thus, electronic magnetometer 1016 may be used as an electronic compass. Camera subsystem 1020 and an optical sensor 1022, e.g., a charged coupled device (CCD) or a complementary metal-oxide semiconductor (CMOS) optical sensor, may be utilized to facilitate camera functions, such as recording photographs and video clips. Audio subsystem 1026 may be coupled to a speaker 1028 and one or more microphones 1030 to facilitate voice-enabled functions, such as voice recognition, voice replication, digital recording, and telephony functions.

Communication functions may be facilitated through one or more communication subsystems 1024. Communication subsystems 1024 may include one or more wireless communication subsystems. Wireless communication subsystems 1024 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 1024 may depend on the communication network(s) or medium(s) over which the device 1000 is intended to operate. For example, a device may include wireless communication subsystems designed to operate over Long Term Evolution (LTE) or Code Division Multiple Access (CDMA), e.g., CDMA2000 and Wideband CDMA (WCDMA), Global System for Mobile Communications (GSM), a General packet radio service (GPRS) network, an enhanced data GSM environment (EDGE) network, IEEE 802.11 communication network, or a Bluetooth™ network. Communication subsystems 1024 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 1040 may include touch controller 1042 and/or other input controller(s) 1044. Touch controller 1042 may be coupled to a touch surface 1046. Touch surface 1046 and touch controller 1042 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1046. In one implementation, touch surface 1046 may display virtual or soft buttons and a virtual keyboard, which may be used as an input/output device by the user.

Other input controller(s) 1044 may be coupled to other input/control devices 1048, such as one or more buttons, rocker switches, thumb-wheel, infrared port, USB port, and/or a pointer device such as a stylus. The one or more buttons (not shown) may include an up/down button for volume control of speaker 1028 and/or microphone 1030. In some implementations, device 1000 may present recorded audio and/or video files, such as MP3, AAC, and MPEG video files. In some implementations, device 1000 may include the functionality of an MP3 player and may include a pin connector for tethering to other devices. Other input/output and control devices may be used.

Memory interface 1002 may be coupled to memory 1050. Memory 1050 may include high-speed random access memory or non-volatile memory, such as one or more magnetic disk storage devices, one or more optical storage devices, or flash memory (e.g., NAND, NOR). Memory 1050 may store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 may include a kernel (e.g., UNIX kernel).

Memory 1050 may also store communication instructions 1054 to facilitate communicating with one or more additional devices. Communication instructions 1054 may also be used to select an operational mode or communication medium for use by the device, based on a geographic location (obtained by the GPS/Navigation instructions 1068) of the device. Memory 1050 may include graphical user interface instructions 1056 to facilitate graphic user interface processing, including a touch model for interpreting touch inputs and gestures; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes; camera instructions 1070 to facilitate camera-related processes and functions; and application storage 1072 for storing applications for implementing the features and processes described in reference to FIGS. 1-9.

Each of the above identified instructions and applications may correspond to a set of instructions for performing one or more functions described above. These instructions need not be implemented as separate software programs, procedures, or modules. Memory 1050 may include additional instructions or fewer instructions. Furthermore, various functions of the device may be implemented in hardware and/or in software, including in one or more signal processing circuits, FPGA (field programmable gate array), or an ASIC (application-specific integrated circuit).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, one or more ASICs or FPGAs.

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The apparatus can also include one or more memory structures such as nonvolatile memory, volatile memory, or both.

As described above, some aspects of the subject matter of this specification include gathering and use of data available from various sources to improve services a wireless device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, at a wireless device, signals that are transmitted at different times, each of the signals having a different carrier frequency and representing a different subchannel of a wireless channel;
   determining estimated magnitudes of the subchannels based respectively on the signals;
   determining estimated group delays of the subchannels based respectively on the signals, wherein determining the estimated group delays comprises computing phase angles of a respective subchannel of the subchannels based on a Fourier transformation of a respective signal of the signals and a Fourier transformation of a reference signal, and applying a fit function to the phase angles to produce an estimated group delay of the respective subchannel;
   determining an estimated channel frequency response of the wireless channel based on the estimated magnitudes and the estimated group delays;
   determining a propagation delay of the signals based on the estimated channel frequency response; and
   generating position information based on the propagation delay.

2. The method of claim 1, wherein applying the fit to the phase angles comprises fitting a n-degree polynomial to the phase angles, wherein n is a positive integer greater than one.

3. The method of claim 1, comprising:
   generating a pseudo spectrum based on the estimated channel frequency response; and
   detecting a peak of the pseudo spectrum, wherein detecting the peak comprises selectively ignoring one or more peaks of the pseudo spectrum that do not exceed a threshold,
   wherein determining the propagation delay comprises using the detected peak.

4. The method of claim 1, comprising:
   determining estimated phase responses based on the estimated group delays, wherein the estimated channel frequency response is based on the estimated phase responses.

5. The method of claim 4, wherein determining the estimated phase responses comprises integrating the estimated group delays to produce the estimated phase responses.

6. The method of claim 1, wherein receiving the signals comprises receiving a signal that comprises multiple versions of a packet that are caused by echoes within the wireless channel, wherein the packet is transmitted in accordance with a frequency hopping protocol.

7. The method of claim 1, wherein a frequency bandwidth of each of the subchannels is about 1 MHz.

8. The method of claim 1, wherein the wireless device is a Bluetooth enabled device.

9. A method comprising:
   receiving, at a wireless device, narrowband signals transmitted over a wireless channel, each narrowband signal having a frequency that is different from frequencies of the other narrowband signals, each narrowband signal representing a subchannel of the wireless channel;
   estimating, by the wireless device, a subchannel frequency response for each narrowband signal, wherein estimating the subchannel frequency response comprises computing a group delay by determining a phase difference between the received narrowband signal and the transmitted narrowband signal, and integrating the group delay to obtain an approximated phase component;
   estimating, by the wireless device, a wireless channel frequency response based on the subchannel frequency responses; and
   estimating, by the wireless device, a propagation delay of the narrowband signals based on the wireless channel frequency response.

10. The method of claim 9, wherein estimating the subchannel frequency response comprises:
    approximating a magnitude component of the subchannel frequency response as a constant; and
    approximating a phase component of the subchannel frequency response as a straight line.

11. The method of claim 10, wherein approximating the magnitude component comprises dividing an energy of the received narrowband signal with an energy of the transmitted narrowband signal.

12. The method of claim 9, comprising:
generating, by the wireless device, a pseudo spectrum based on the estimated wireless channel frequency response, wherein estimating the propagation delay comprises identifying a peak in the pseudo spectrum.

13. The method of claim 9, wherein estimating the subchannel frequency response comprises:
approximating a magnitude component of the subchannel frequency response as a constant; and
approximating a phase component of the subchannel frequency response using an n-order polynomial, wherein n is a positive integer greater than one.

14. The method of claim 9, wherein estimating the subchannel frequency response comprises jointly unwrapping phase information and estimating phase fit parameters.

15. A device comprising:
a receiver configured to receive signals that are transmitted at different times, each of the signals having a different carrier frequency and representing a different subchannel of a wireless channel; and
a processor coupled with the receiver, wherein the processor is configured to
determine estimated magnitudes of the subchannels based respectively on the signals,
determine estimated group delays of the subchannels based respectively on the signals,
determine an estimated channel frequency response of the wireless channel based on the estimated magnitudes and the estimated group delays,
determine a propagation delay of the signals based on the estimated channel frequency response, and
generate position information based on the propagation delay,
wherein the processor is configured to compute phase angles of a respective subchannel of the subchannels based on a Fourier transformation of a respective signal of the signals and a Fourier transformation of a reference signal, and apply a fit function to the phase angles to produce an estimated group delay of the respective subchannel.

16. The device of claim 15, wherein the processor is configured to fit a n-degree polynomial to the phase angles, wherein n is a positive integer greater than one.

17. The device of claim 15, wherein the processor is configured to
generate a pseudo spectrum based on the estimated channel frequency response, and
detect a peak of the pseudo spectrum by selectively ignoring one or more peaks of the pseudo spectrum that do not exceed a threshold,
wherein the propagation delay is based on the detected peak.

18. A device comprising:
a receiver configured to receive narrowband signals that are transmitted at different times, each narrowband signal having a frequency that is different from frequencies of the other narrowband signals, each narrowband signal representing a subchannel of the wireless channel; and
a processor coupled with the receiver, wherein the processor is configured to perform operations comprising:
estimating a subchannel frequency response for each narrowband signal, wherein estimating the subchannel frequency response comprises computing a group delay by determining a phase difference between the received narrowband signal and the transmitted narrowband signal, and integrating the group delay to obtain an approximated phase component;
estimating a wireless channel frequency response based on the subchannel frequency responses; and
estimating a propagation delay of the narrowband signals based on the wireless channel frequency response.

19. The device of claim 18, wherein estimating the subchannel frequency response comprises:
approximating a magnitude component of the subchannel frequency response as a constant; and
approximating a phase component of the subchannel frequency response as a straight line.

20. The device of claim 19, wherein approximating the magnitude component comprises dividing an energy of the received narrowband signal with an energy of the transmitted narrowband signal.

21. The device of claim 18, wherein the processor is configured to perform operations comprising generating a pseudo spectrum based on the estimated wireless channel frequency response, wherein estimating the propagation delay comprises identifying a peak in the pseudo spectrum.

22. The device of claim 18, wherein estimating the subchannel frequency response comprises:
approximating a magnitude component of the subchannel frequency response as a constant; and
approximating a phase component of the subchannel frequency response using an n-order polynomial, wherein n is a positive integer greater than one.

23. The device of claim 18, wherein estimating the subchannel frequency response comprises jointly unwrapping phase information and estimating phase fit parameters.

* * * * *